United States Patent [19]
Beery et al.

[11] 3,737,158
[45] June 5, 1973

[54] CONTROLLED TORQUE DOCUMENT FEED SYSTEM

[75] Inventors: Jack Beery, Farmington; Donald C. Russell, Plymouth, both of Mich.

[73] Assignee: Burroughs Corporation, Detroit, Mich.

[22] Filed: Sept. 17, 1971

[21] Appl. No.: 181,525

[52] U.S. Cl. ..........................271/10, 271/39, 271/57
[51] Int. Cl. ............................B65h 3/06, B65h 5/06
[58] Field of Search......................271/10, 34, 35, 36, 271/39, 41, 57; 198/37; 214/8.5 G, 8.5 H

[56] References Cited
UNITED STATES PATENTS

| | | | |
|---|---|---|---|
| 3,545,742 | 12/1970 | Muller et al. | 271/10 |
| 3,159,396 | 12/1964 | Barber | 271/10 X |
| 2,966,253 | 12/1960 | Gerrans | 198/37 |
| 3,236,358 | 2/1966 | Gieskieng | 198/37 |
| 3,204,950 | 9/1965 | Hauchett | 271/57 |

Primary Examiner—Evon C. Blunk
Assistant Examiner—Bruce H. Stoner, Jr.
Attorney—Paul W. Fish and Edwin W. Uren

[57] ABSTRACT

There is disclosed herein a portion of a document transport system including a document storage hopper, a document feeding unit, a document separator and a control system for varying the feeding of a document. A document is removed from the hopper by a motor driven feed member and placed or moved into a document guideway. To initially remove the document from the hopper, a high torque output from the motor is desired and when the document is being moved along a document guideway a lower torque is required.

10 Claims, 4 Drawing Figures

INVENTORS
JACK BEERY
DONALD C. RUSSELL
BY
Russell C. Wells
ATTORNEY

CONTROLLED TORQUE DOCUMENT FEED SYSTEM

CROSS REFERENCE TO RELATED APPLICATION

A patent application entitled "Document Separator Control System" by Jack Beery having Ser. No. 81,808 and filed on Oct. 19, 1970 now U.S. Pat. No. 3,635,465 describes and claims the document separator shown in the present application and is assigned to the same assignee as this patent application.

BACKGROUND OF THE INVENTION

1. Field of Invention

This invention relates to the field of sheet or document feeding apparatus and in particular to a control system for varying the torque that is required to be applied to documents at the beginning of a document transport operation.

2. Prior Art

Previous mechanisms used to move documents from a storage hopper to transport guideways, such as in check sorters, relied on a constantly driven friction member. This member typically slipped against the document during feeding thereby causing paper slippage. Slippage of drive wheels against the document also affected the quality of the print on the document, and in some instances erased or removed some of the print thereon.

Also several prior art systems employ a vacuum process for holding the document against a belt for movement thereby. In such a system the document was or could be overdriven to thereby cause a jam condition.

It is a principal object of the present invention to eliminate paper slippage in a friction document drive by varying the amount of torque applied to the document.

It is another object of the present invention to reduce the wear on the constantly rotating drive wheels which previously mated with the idlers when no document was being transported and the system was in an idling state by reducing or eliminating power to the wheels.

The present inventive system utilizes a d.c. motor which is responsive to the current applied to its windings for varying the torque output of the motor. A high current generates a high torque which in turn is applied to a document to remove the document from a storage hopper and to initially move the document along the guideway. When the moved document reaches a predetermined point in the guideway, a sensor effects a reduction in the current that is applied to the motor, hence reducing the torque output thereof. At a predetermined interval of time after the sensor indicates that a document has passed thereby and a succeeding document has not reached the sensor, the high current is again applied to the motor to remove another document from the hopper.

It is still another object of present invention to remove the scrubbing action of the feed wheels on the document markings which causes erasure of the marking material from the document.

SUMMARY OF INVENTION

The invention resides in the provision, in a document handling system, of a controlled torque document feed system for varying the torque that is applied to the documents. In such document handling system, document storage means is positioned at one end of a document guideway. The document storage means stores a plurality of documents prior to their being removed and moved along the guideway. The documents are moved from the storage means at a point thereof adjacent the upstream end of the guideway. Downstream from the storage means and positioned adjacent to the guideway is a sensing means which is responsive to the passage of a document thereby. In response to signals generated by said sensing means, a document control member, which is electrically connected to the document drive means to normally maintain the torque output of the drive means at a low value, increases the torque output of the drive means, after a predetermined period of time, if another and succeeding document is not sensed by the sensing means.

DETAILED DESCRIPTION

Figure 1:
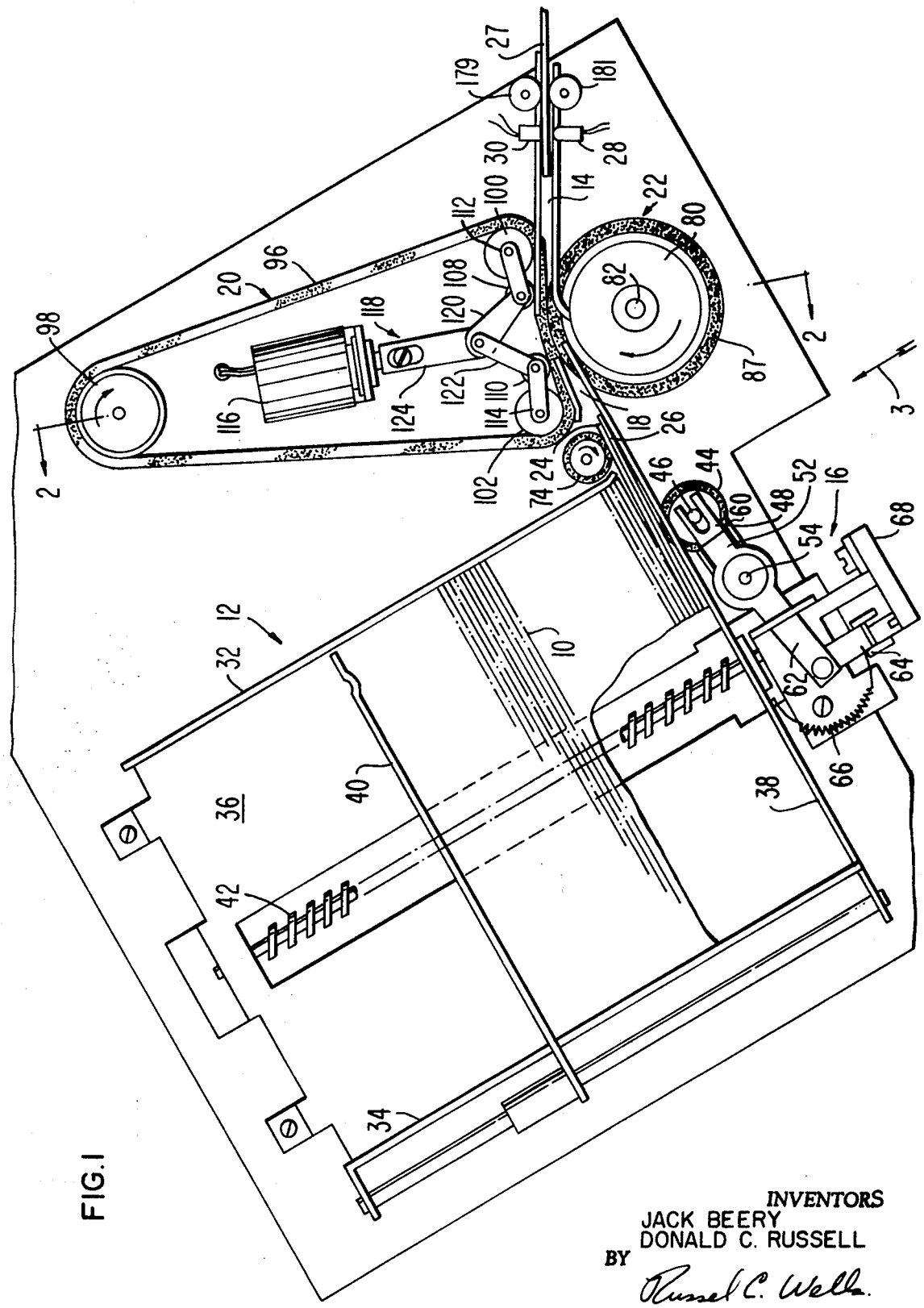
FIG. 1 is a plan view of a document feed station including a separator unit and document storage means.

Referring to the Figs. by the characters of reference, there is illustrated in FIG. 1 a portion of a document transport system. A plurality of documents 10 are initially stored in a document storage means or hopper 12 prior to being fed along a document guideway 14 and 18. The documents are dispensed from the hopper at one end of the guideway 14 under the control of a hopper feed unit 16 through an inner connecting guideway 18 to a separator unit 20 and an associated document drive unit 22. The separator unit functions in such manner as to remove overlapping documents such as the document 24 illustrated in FIG. 1 from the first or front document 26 which is ultimately driven by the document drive unit into the guideway 14.

Positioned downstream from the one end of the guideway 14 is a sensing means comprising a source of radiant energy or lamp 28 on one side of the guideway, and a photoelectric cell 30 directly opposite on the other side of the guideway. Whenever a document such as the document 27 is not positioned between the cell 30 and the lamp 28, the cell generates a first electrical signal to indicate the absence of the document therebetween. When a document is positioned between the cell and the lamp, the cell generates a second electrical signal indicating the presence of the document.

In the alternative, the sensing means may comprise a sonic source on one side of the guideway and a sonic detector opposite thereto. Whenever a document passes between the sonic source and the detector, the sonic waves from the source are prevented from reaching the detector. In such case the detector would be a transducer effective for converting sonic energy into electrical signals. The voltage output from the detector would accordingly be proportional to the amount of sonic energy reaching the detector.

The hopper 12 is formed by a pair of parallel spaced apart elongated side plates 32 and 34 extending orthogonally from a base plate 36. A fixed front plate 38 encloses one end of the hopper and extends to form one side of the interconnecting guideway 18. The other end of the hopper is enclosed by a movable back-up plate 40 which is movable under power toward the fixed front plate by a lead screw 42. The junction of the side plate 32 and the fixed front plate 38 forms an outlet from which the documents 10 are dispensed into the interconnecting guideway 18. Positioned outside the hopper 12 and extending through the fixed front plate 38 is the hopper feed unit 16.

The function of the hopper feed unit is to dispense the documents from the hopper for eventual travel along the guideway 14. The documents 10 in the hopper are stacked along their edges with their front broadsides parallel to the fixed front plate 38 of the hopper. The movable back-up plate 40 cooperates with the front plate 38 to keep the documents compacted against the fixed front plate 38.

Figure 2:
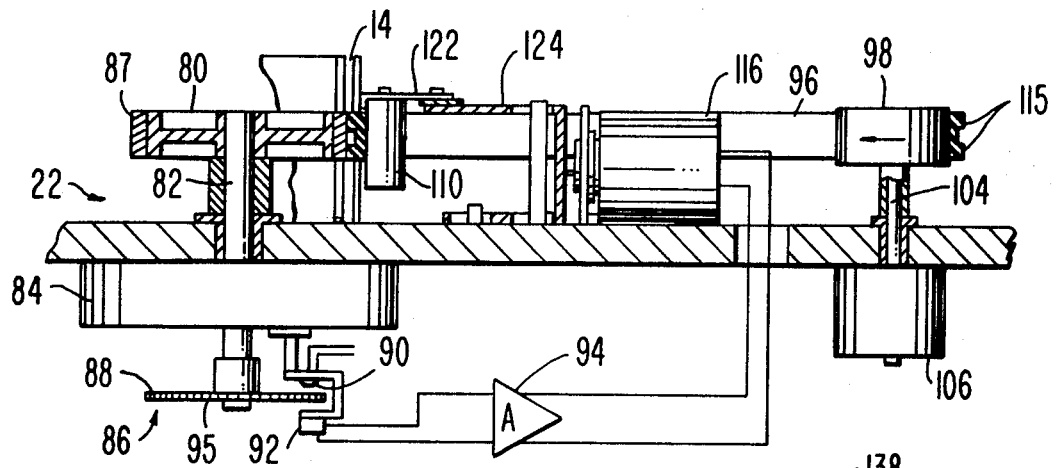
FIG. 2 is a sectional view taken along the line 2—2 of FIG. 1.

The hopper feed unit 16 comprises a pair of parallel spaced apart feed wheels 44 which are fixedly mounted to a feed wheel shaft 46. The feed wheel shaft 46 is supported between a pair of parallel spaced apart arms 48 and 50 (FIG. 2) of a yoke 52. The shaft 46 is pivotally mounted around and spaced from a drive shaft 54 which in turn is driven by a d.c. motor 56. The feed wheels 44 are driven by a belt 60 connecting the drive shaft 54 and the feed wheel shaft 46. A lever 62 mounted for pivotal rotation around the drive shaft 54 is connected to the yoke 52 and extends away from the drive shaft 54 in a direction opposite to that of the yoke 52.

Connected to the free end of the lever 62 are a switch actuation member 64 and a constant pressure spring 66. The constant pressure spring 66 functions to bias the feed wheels 44 through the fixed front plate 38 of the hopper and onto the front broadsides of the documents 10. The amount of displacement of the feed wheels 44 into the hopper is sensed by a switch 68, which when actuated electrically, couples the lead screw 42 through a gear box 70 to a motor 58. When electrical power is supplied to the gear box 70, to interconnect a motor drive shaft 72 of the motor 58 with the lead screw 42, movable back-up plate 40 is moved in a direction toward the fixed front plate 38 to compress the stack of documents 10 thereagainst. As the documents are pressed forward, the hopper feed unit 16 is pivoted about the drive shaft 54 and the switch actuating member 64 is removed from the switch electrically disconnecting the gear box coupling between the lead screw 42 and the drive shaft 72, causing the lead screw to stop rotating.

Positioned in the interconnecting guideway 18 and outside of the outlet of the hopper is a constantly rotating stripper wheel 74. The stripper wheel 74 is mounted on a shaft 76 (FIG. 2) and is coupled to the motor 58 by a belt 78 causing the stripper wheel to rotate in the direction indicated by the arrow in FIG. 1. The cylindrical surface of the stripper wheel 74 comes in contact with the broadsides of the overlapping documents being dispensed from the hopper when there are an excessive number of documents attempting to leave the hopper, to thereby prevent the excessive number of overlapping documents from leaving the hopper and jamming the interconnecting guideway. The stripper wheel 74, however, will permit a number of overlapping documents to be moved through the interconnecting guideway 18 to be further separated by the separator unit 20.

The document drive unit 22 comprises a drive wheel 80 connected to a motor drive shaft 82. The drive shaft 82 extends through a low inertia, high response motor 84 (FIG. 2), such as a moving coil d.c. motor, and terminates with the velocity indicator unit 86. The cylindrical peripheral surface of the wheel 80 is treated to have a high coefficient of friction between the wheel and the front broadside surface of the front document 26. In the preferred embodiment, this surface is coated with natural rubber in the form of a tire 87.

The velocity indicator unit in the preferred embodiment of the invention is connected to the motor drive shaft 82 and comprises a rotating slotted disk 88 rotatively driven between a photoelectric cell excitor or a lamp 90 and the photoelectric cell 92. Electrical signals generated in the cell 92 are electrically supplied to a current amplifier 94. As slots 95 of the disk 88 pass between the lamp and the cell, the alternate light and dark conditions of the cell generate an electrical signal indicating the presence or absence of a slot. With the disk connected for rotation to the motor drive shaft 82, the frequency of the electrical signals from the cell 92 is proportional to the rotational velocity of the drive shaft 82.

The separator unit 20 (FIG. 1) in the preferred embodiment comprises a separator member or scrubber belt 96 driven by a drive pulley 98 along an enclosed path defined by a pair of fixed guide wheels 100 and 102. The drive pulley 98 is connected by a driven shaft 104 (FIG. 2) to a low speed, high torque motor 106. The path of the belt 96 is altered by the positioning of a pair of movable guide rollers 108 and 110 (FIG. 1). The movable guide roller 108 is pivotable about the shaft rotatably supporting the fixed guide wheel 100, by the link 112. The movable guide roller 110 is pivotable about the shaft rotatably supporting the fixed guide wheel 102 by the link 114.

The separator member 96 in the preferred embodiment is a flexible urethane foam belt having two parallel spaced apart ridges 115 (FIG. 2) extending in the direction of the length of the belt. The function of these ridges is to give the belt a degree of compressibility when in contact with the documents without the attendant spread of the belt. The loading on the belt by the document is thus more uniform than with a solid belt. However, if the loading is minimal, then a solid cross sectional belt of urethane foam may be used. In either event, the frictional operation of the control system is not changed.

The movable guide wheels 108 and 110 (FIG. 1) are positioned in response to the operation of a linear actuator 116 acting through a Y-shaped member 118. The arms 120 and 122 are pivotally mounted at their respective guide wheels 108 and 110 and are jointed in a pivotable connection to the body portion 124 of the Y-shaped lever. The body member 124 is an extension of the armature of the linear actuator 116 and as the armature is driven out of the linear actuator, the movable guide wheels will alter the path of the belt 96. This alteration of path will both change the amount of wrap between the belt 96 and the drive wheel 80 and increase the pressure applied to the wheel. The operation of the linear actuator 116 acting upon the belt 96 maintains the frictional forces between the belt 96 and the drive wheel 80 or between the belt 96 and the overlapping document 24. The linear actuator is electrically connected and responsive to the output of the current amplifier 94. As the speed of the drive motor 84 changes, the amount of current to the linear actuator changes in direct proportion to the speed change.

Figure 3:
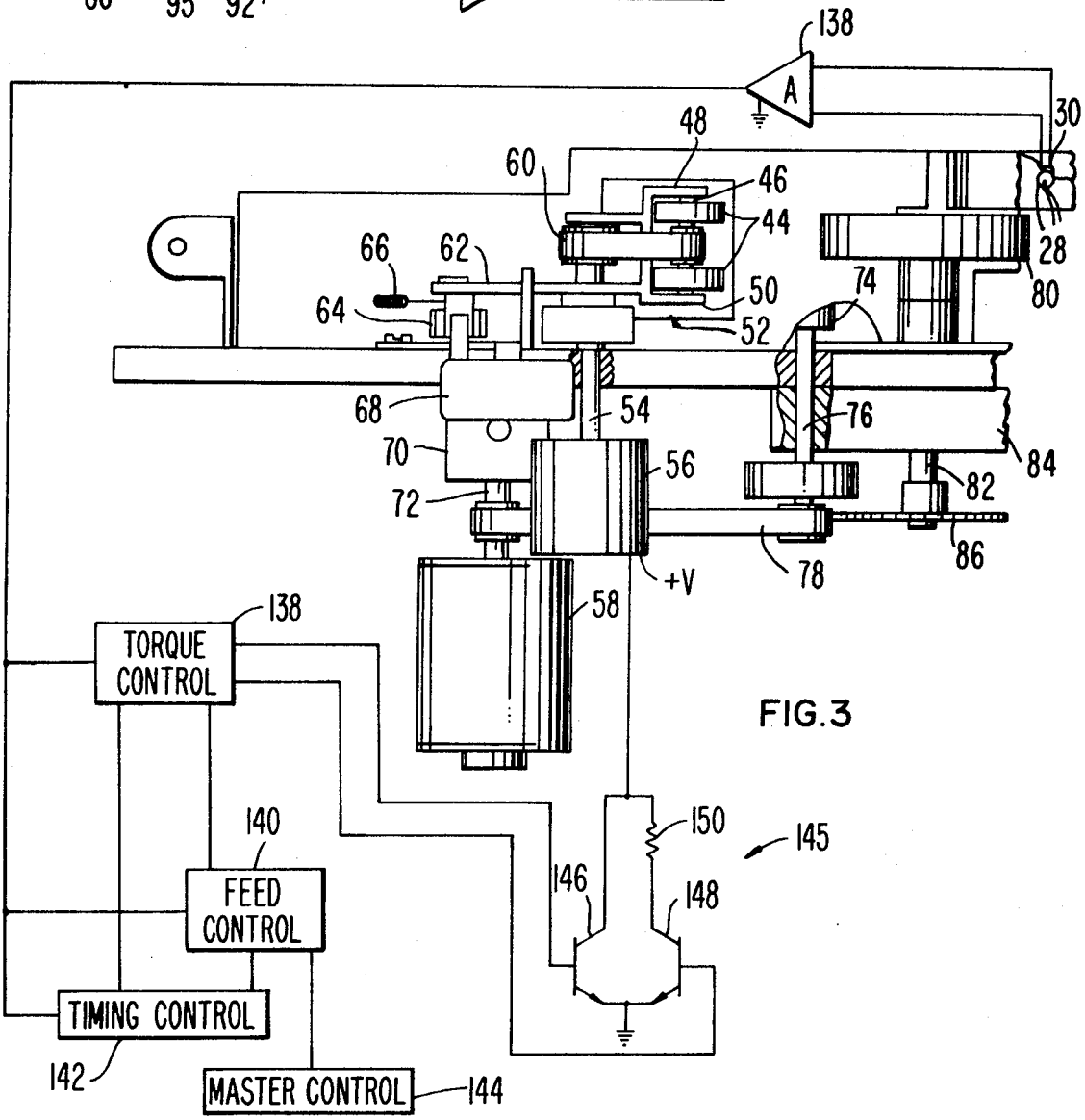
FIG. 3 is an end view of the apparatus of FIG. 1 including a block diagram of the control system for the document feed motor.

The controlled torque document feed system as is diagrammatically illustrated in FIG. 3 comprises the sensing means 28 and 30 (also shown in FIG. 1) operatively coupled to a torque control unit 138 controlling the amount of current through the motor 56 in response to a feed control unit 140 and a timing control unit 142. The feed control unit 140 is responsive to a command from a master control section 144 of the apparatus signaling for the feed of one or more documents from the hopper 12. The timing control unit 142 provides a plurality of timing signals to both the torque control unit 138 and the feed control unit 140.

The basic principal of the controlled torque document feed system illustrated in FIG. 3 is to provide for the development of high output torque from the motor 56 for removing the first document from the hopper 12. On succeeding documents, the torque output of the motor is normally lower than the initial high torque unless a document fails to be moved a predetermined distance within a predetermined time. Too much force applied to the document when unnecessary can damage the document and likewise too little force will fail to move the document.

The torque control unit 138 is operatively connected in the preferred embodiment to a document control member 145 comprising two transistors 146 and 148 electrically connected in parallel to each other and together in electrical series circuit with the motor 56. The first transistor 146, when in conduction, causes the maximum of current to flow through the motor 56 and thereby developing the largest torque output from the motor. The second transistor 148 has a resistance element 150 in series with its collector thereby when the second transistor 148 is in conduction the amount of current flowing through the motor is substantially less than maximum.

The feed control unit 140, as previously stated, is responsive to a command from a master control section 144 such as the program of a central processing unit. When the master control section calls for a document or a plurality of documents to be fed, the feed control unit 140 activates the timing control unit 142 for the generation of a plurality of feed timing signals controlling the torque control unit 138 which controls the application of different torque generating currents to the motor, and in case of a document miss-feed or non-feed, a timing signal will turn off the feed control unit.

Figure 4:
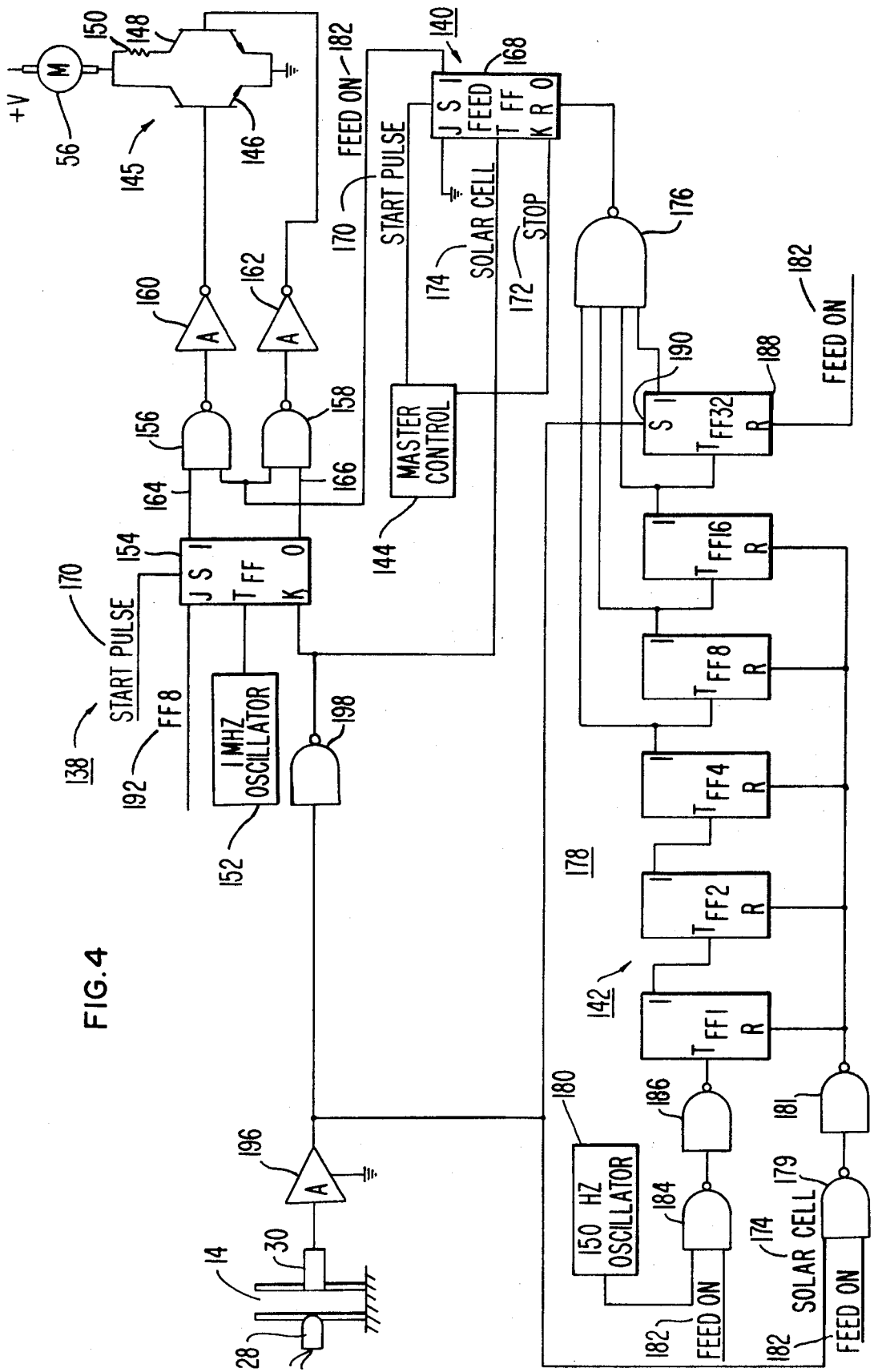
FIG. 4 is a schematic of the control system.

Referring to the schematic of FIG. 4, there is illustrated the preferred embodiment of the document control system of FIG. 3. The torque control unit 138 of FIG. 3 comprises a high frequency oscillator 152, a control flip flop 154, a pair of NAND gates 156 and 158, a pair of amplifiers 160 and 162 and the document control member 145. The high frequency oscillator 152 functions as a source of triggering signals to the control flip flop 154 for providing a fast response for the control signals to the flip flop 154. The two two-input NAND gates 156 and 158 are electrically connected at one input 164 and 166 to each output of the control flip flop 154. The control flip flop 154 thereby is providing the selecting signal to control the torque output of the motor 56. The two amplifiers 160 and 162 have a positive output whenever the input is negative or stated another way, whenever the input is negative the amplifier 160 or 162 and its associated transistor 146 and 148 respectively are conducting.

The feed control unit 140 comprises the feed flip flop 168 and its associated signals. The feed control flip flop 168 is initially set by a start pulse signal 170 and is normally reset by a stop pulse signal 172 from the master control unit 144. The start pulse signal 170 is a negative pulse having a time period sufficient to cause the feed flip flop 168 to set to its one state. The stop pulse signal 172 is a positive level which when combined with a signal 174 from the sensing means 28 and 30 will reset the flip flop 168. Additionally the feed flip flop is reset by a negative signal from a four input NAND gate 176 which signifies that a document has either not been fed or that there is a document problem. If such is the case the feed system is shut down and the machine operator must clear the problem.

The timing control unit 142 comprises a six-stage ripple counter 178 which is counted by low frequency oscillator 180 in response to the feed control unit signal 182 and is reset when a document passes the sensing means. The low frequency oscillator 180 and its associated logic circuitry 184 and 186 may represent a machine timing source and need not be crystal oscillator. The function of the low frequency oscillator 180 is to provide a pulse train of equally spaced timing signals to be counted by the counter 178. As indicated the feed on signal 182 controls the application of the oscillator output pulses to the counter 178. The ripple counter 178 as respects the first five stages, is reset through the two NAND gates 179 and 18' each time that a document is sensed by the sensing means. The sixth stage 188 is initially reset for the first document and after that document has passed the sensing means it and each succeeding document sets the flip flop. This in effect allows the counter 178 to count the final stage for the first document only thereby giving the first document an additional 32 counts of time to reach the sensing means.

By the use of this six stage ripple counter 178, there is provided three different control times to control the application of high torque to the documents coming out of the hopper 12. The first control time essentially uses the full count of the ripple counter 178 and is indicated by the four input NAND gate 176. The second control time uses a count time approximately equal to half of the total count of the counter. Again this is illustrated in the four input NAND gate 176 cooperating with the sensing means signal 174 applied to the document set input 190 of the last stage flip flop 188. The third control time is a small portion of the count time and is represented by the FF8 signal 192 applied to the set input 194 of torque control flip flop 154. This count time delays the application of high torque to the second and succeeding documents for a predetermined period of time which is normally a sufficient time period to move the document from the hopper to the sensing means.

OPERATION

The master control unit 144 generates a start pulse signal 170 which indicates that a document is to be removed from the hopper. This signal 170 sets the feed flip flop 168 and the torque control flip flop 154. Through the one NAND gate 156 the first transistor 146 is driven into conduction. This causes a high current to flow through the motor 56 developing a high torque output therefrom. Additionally the feed flip flop 168 through the Feed On signal 182 initiates the ripple counter 178 through the pair of NAND gates 184 and 186.

After the first document is sensed by the sensing means the amplifier 196 generates a solar cell signal 174 which resets through the NAND gate 198 the torque control flip flop 154 thereby reducing the current through the motor; resets the first five stages of the ripple counter and sets the last stage 188 of the ripple counter.

The above control system provides for an initially high current (start pulse) to be driven through the motor for the first document, a delayed high current (FF8) to be applied to the motor for each succeeding document and a system halt signal in the event of a document malfunction.

What is claimed is:

1. In a document handling system, a controlled torque document feed system comprising:
   a document guideway having a plurality of spaced apart guide members for guiding documents singly along the guideway;
   a document storage means at one end of said guideway for storing a plurality of documents prior to being transported therealong;
   document drive means adjacent said one end of said guideway and adapted for moving a document from said storage means to said guideway;
   sensing means positioned along said guideway and downstream from said one end, said sensing means being effective for generating a first and a second signal according to whether or not a document is sensed thereby; and
   a document control member electrically connected to said document drive means and responsive to said first signal of said sensing means for increasing the torque output of said document drive means when a document is not sensed by said sensing means and responsive to said second signal of said sensing means for decreasing the torque output of said document drive means when a document is sensed by said sensing means.

2. The controlled torque document feed system according to claim 1 wherein said sensing means is a photoelectric cell responsive to a source of radiant energy for indicating the presence of a document therebetween.

3. The controlled torque document feed system according to claim 1 wherein said document control member further includes a first transistor responsive to said sensing means in the absence of a document for supplying a first current to said drive means providing a high torque output therefrom and a second transistor responsive to said sensing means in the presence of a document for supplying a second current to said drive means providing a low torque output therefrom.

4. The controlled torque document feed system according to claim 3 further including a timing member responsive to said sensing means for removing said first and second current from said drive means whenever a document is not sensed by said sensing means for a predetermined period of time.

5. In a document handling system, a controlled torque document feed system comprising:
   a document guideway having a plurality of document guide members spaced apart along said guideway for guiding documents singly therealong;
   a document storage hopper adjacent one end of said document guideway for storing a plurality of documents to be transported along said document guideway;
   a document drive motor operatively coupled to said storage hopper for removing documents singly therefrom and initially moving the removed document along said document guideway;
   document sensing means positioned along said document guideway and downstream from said document storage hopper, said sensing means generating a first electrical signal when a document is not sensed by said sensing means and generating a second electrical signal when a document is sensed thereby;
   a first transistor electrically connected to said document drive motor and responsive to said first electrical signal for supplying a current to said document drive motor developing a first torque therefrom for removing a document from said document storage hopper;
   a second transistor electrically connected to said document drive motor and responsive to said second electrical signal for supplying a current to said document drive motor developing a second torque therefrom for moving the removed document along said document guideway; and
   a timer responsive to said first electrical signal and operative to turn off said first transistor after a predetermined period of time in the absence of said second electrical signal.

6. In a document handling system according to claim 5 wherein said timer additionally includes means for delaying the initial turn off of said first transistor for allowing the first document to be fed along said system a greater time period than the succeeding documents to reach said document sensing means.

7. In a document handling system according to claim 5 wherein said timer additionally includes means for delaying the application of high current to said drive motor until after a predetermined period of time for allowing the previously fed document to be moved further along the guideway from said document sensing means.

8. In a document handling system according to claim 5 wherein said timer is a multi-stage ripple counter being counted by a plurality of fixed period timing pulses.

9. In a document handling system according to claim 8 wherein the last stage of said ripple counter is counted on the initial document fed by the system to allow an additional delay time for turning off said first transistor and said last stage is automatically negated on each succeeding document to be fed.

10. In a document handling system according to claim 8 wherein said ripple counter is counted to a predetermined count, less than the desired count for delaying the application of high current to said drive motor a predetermined period of time thereby allowing the previous fed document to be moved further along the guideway away from said document.

* * * * *